United States Patent [19]
Weber et al.

[11] Patent Number: 4,972,085
[45] Date of Patent: Nov. 20, 1990

[54] COLD SHIELDING OF INFRARED DETECTORS

[75] Inventors: Jonathan L. Weber, Clinton, N.Y.; Jeffrey A. Johnson, So. Hadley, Mass.; William R. Haas, Amherst, N.H.

[73] Assignee: General Electric Company, Syracuse, N.Y.

[21] Appl. No.: 407,260

[22] Filed: Sep. 14, 1989

[51] Int. Cl.⁵ .............................. G01J 5/06; G01J 5/08
[52] U.S. Cl. ....................................... 250/352; 250/332
[58] Field of Search ........................ 250/352, 353, 332

[56] References Cited

U.S. PATENT DOCUMENTS

| 3,163,760 | 12/1964 | Brumfield et al. | |
| 3,448,267 | 6/1969 | Blythe et al. | |
| 3,601,611 | 8/1971 | Kendall | |
| 4,383,173 | 5/1983 | Neil et al. | 250/352 |
| 4,431,917 | 4/1984 | Gibbons | 250/332 |
| 4,431,918 | 4/1984 | White | 250/352 |
| 4,507,551 | 3/1985 | Howard et al. | 250/352 |
| 4,558,222 | 12/1985 | Neil | 250/353 |
| 4,783,593 | 11/1988 | Noble | 250/352 |

Primary Examiner—Carolyn E. Fields
Attorney, Agent, or Firm—Paul Checkovich; Richard V. Lang

[57] ABSTRACT

An infrared detection system is disclosed in which a re-imaging optical system produces a non-axisymmetric aperture stop image at an exit pupil point in or near the cold shield entrance aperture. To achieve high cold shield efficiency notwithstanding the asymmetry of the aperture stop image and the resulting astigmatism in such image, two exit pupil stop members disposed in non-coplanar relation are provided adjacent the exit pupil point. The stop aperture in one such member has its radially extending edges congruent with the corresponding edges of the aperture stop image and is disposed in the plane of best exit pupil formation for those edges; the aperture in the other exit pupil stop member is correspondingly configured and oriented with respect to the circumferential edges of the aperture stop image.

3 Claims, 4 Drawing Sheets

COLD SHIELDING OF INFRARED DETECTORS

The Government has rights in this invention pursuant to Contract F04701-85-C-0069 awarded by the Department of the Air Force.

BACKGROUND OF THE INVENTION

This invention relates generally to infrared (IR) detection systems and more particularly to such systems for which application requirements necessitate the use of non-axisymmetric optics systems.

Current IR detection systems comprise focal plane arrays of sensor elements that operate at cryogenic temperatures and accordingly require array mounting in a dewar or similarly cooled enclosure. It is also necessary to provide cold shielding of the detector element array, to avoid the degradation in signal-to-noise ratio that results when the detector element fields of view include optics system structural members that are at temperatures above cryogenic. Cold shielding currently is usually accomplished using one or more of the following basic methods:

(1) Place all or part of the focusing elements inside the cold region surrounding the focal plane detectors;

(2) Extend the dewar window in front of the focal plane and thereby move the aperture in the cold shield as far as possible from the detectors;

(3) Use reflectors to produce a "Narcissus" effect over the entire field of view; and (4) Design the focus system to place its exit pupil at the cold shield aperture.

The last of the above-listed techniques derives from the so-called "Solar Coronagraph" developed some decades ago by B. Lyot for observation of the sun's corona. This instrument comprised a re-imaging optical system with an occulting disk disposed in the plane of the first image and a stop located at the exit pupil adjacent the plane of the second image. Similar optical configurations have later been used in telescopes and other applications in which the rejection of out-of-field radiation is critically important. In such applications Lyot's occulting disc is omitted and a field stop commonly substituted, but the exit pupil stop serves its original purpose and has come to be known as a "Lyot stop".

Lyot stops have found use in infrared imaging systems, where they are particularly useful in reducing the effects of radiation emitted from uncooled walls of the system which would otherwise be included within the IR sensor element's field of view and the radiation from which would thus reduce the signal-to-noise ratio of the system. The practical application of Lyot stops for cold shielding purposes in infrared detector systems is not without some attendant problems, principal among which is that their effectivity is critically dependent on the quality of the exit pupil and as hereinafter explained this can be very difficult to control.

For best performance of IR detection systems the power elements of the system need to be corrected for image quality at the surface of the detector array. The optics cannot at the same time be fully corrected for the effects of astigmatism on the aperture stop image at the exit pupil point, and as a result the uncorrected effects of this aberration significantly degrade exit pupil formation. Then because the performance of a Lyot stop depends on a well formed exit pupil, such uncorrected aberrations at the exit pupil result in reduced cold shield efficiency.

Poor efficiency can be a significant problem even in IR detection systems in which all the mirror, lens and other elements are symmetric with respect to the system optical axis. The problem is significantly more difficult in the case of systems in which these elements are non-axisymmetric, primarily because of the larger optical aberrations that are characteristic of such systems. Thus the reduction in cold shield efficiency attributable to exit pupil anomalies is particularly troublesome in systems having relatively large aberrations due to the presence of off-axis optical elements.

Non-axisymmetric optical element configurations may be necessary to accommodate a number of different detection system requirements, most commonly a requirement that a scanning device such as a rotating or nutating mirror be positioned directly on-axis. Such a system is illustrated in U.S. Pat. No. 4,558,222, for example, which is also of interest because it includes a re-imaging optical system with a stop located at a pupil coincident with the cold shield aperture.

The present invention is addressed to the problem of uncorrected aberrations in infrared sensor systems of this general kind, and specifically in such systems in which the problem of astigmatism is compounded by the inclusion of non-axisymmetric optical elements. The invention has as a primary objective the provision of such systems that provide high efficiency of cold shielding notwithstanding the quality of the exit pupil even as compromised by optical system asymmetries, and that provide this improvement with relatively little attendant additional system complexity or cost.

SUMMARY OF THE INVENTION

In its presently preferred embodiment an IR detection system in accordance with the invention comprises an IR-responsive sensor element enclosed within a cold shield structure having an aperture aligned with the sensor element. A re-imaging optical system includes an aperture stop that is located externally of the cold shield structure and disposed asymmetrically with respect to the optical axis. The optical system is configured to focus the second field image at the plane of the sensor element, and to form an exit pupil at the cold shield aperture. The planes of best exit pupil formation for aperture stop image points at the exit pupil in such system are not the same for radially extending edges of the aperture stop as for its circumferentially extending edges, due to the axial asymmetry of the aperture stop and the resulting differences in astigmatism effects as between the sagittal and meridional planes at the exit pupil point.

To compensate for these deficiencies in exit pupil formation, exit pupil stop means are provided in the form of two stop members disposed closely adjacent the exit pupil point in non-coplanar relation with each other. The aperture in one such stop member has its radially extending edges configured correspondingly to the radially extending edges of the aperture stop, and is disposed in the plane of best exit pupil formation for aperture stop image points in the sagittal plane. The aperture in the other stop member has its circumferentially extending edges configured correspondingly to the circumferentially extending edges of the aperture stop, and is disposed in the plane of best exit pupil formation for aperture stop image points in the meridional plane.

By properly orienting the planes of the two exit pupil stop members with respect to the optical axis, the respective radial and circumferential edges of the apertures in these stop members may be placed in planes of good focus for all points on the corresponding edges of the aperture stop as imaged in the sagittal and meridional planes at the exit pupil. In this way a well formed exit pupil is provided at the two stop members, enabling them to exclude radiation from the optical system walls and other structures without narrowing the field of view of the system or the acceptance solid angle from which radiation can be focused on the detector elements, thus providing a significant improvement in cold shield efficiency.

The Lyot stop originally was intended to prevent out-of-field-of-view radiation from scattering to the focal plane. The present invention achieves this same effect, and in addition functions also to suppress radiation emitted from the walls and other elements of the optical system. The resulting high cold shield efficiency protects the sensor element from emission due to the optics structure as well as from near-field bright sources such as the sun.

BRIEF DESCRIPTION OF THE DRAWINGS

While the specification concludes with claims particularly pointing out and distinctly claiming the present invention, the foregoing and other objects, features and advantages of the invention can be more readily ascertained from the following detailed description when read in conjunction with the accompanying drawings, in which:

DESCRIPTION OF THE PREFERRED EMBODIMENT

Figure 1:
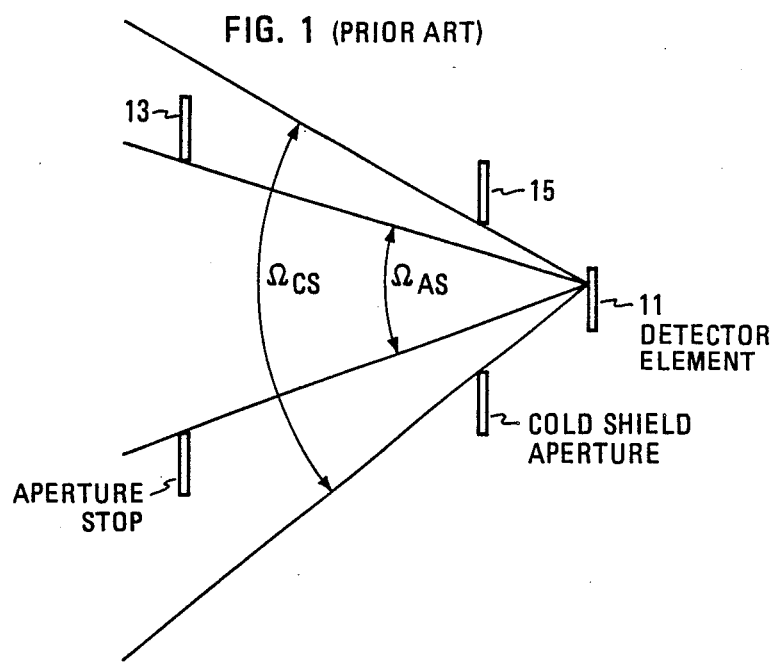
FIG. 1 illustrates the measure of cold shield efficiency in infrared detection systems.

Cold shielding in an infrared detection system is characterized by its efficiency, E, defined as the ratio of the solid angle "seen" by the detector element subtended by the cold shield aperture, to the solid angle required to receive all the energy from the focal system aperture. FIG. 1 illustrates this parameter diagrammatically in a system comprising an IR-sensitive detector element or array 11, an aperture stop 13 and a cold shield enclosure having an aperture 15 disposed at or near the exit pupil point. The aperture stop as seen by the detector element defines an angle $\Omega_{AS}$, and the cold shield aperture an angle $\Omega_{CS}$. The ratio of these angles, $\Omega_{AS}/\Omega_{CS}$, is the measure of cold shield efficiency, E, and typically may be considerably less than 50 percent.

The prior art teaches that stray radiation may be controlled by providing an exit pupil stop configured for approximate congruity with the aperture stop image at the exit pupil point, this exit pupil stop being defined either by the cold shield aperture itself or by a separate stop member located just inside the cold shield. Such exit pupil stop functions in the manner of a Lyot stop as described above.

As there explained, the effectivity of such a stop is critically dependent on the quality of the exit pupil point at which the stop is located. Because the optics train must be corrected for best image quality at the surface of the detector element, optical aberrations such as astigmatism cannot be fully corrected at the exit pupil point, and the efficiency of conventional infrared systems accordingly has been limited by the poor quality of the exit pupil. Particular examples are three and four mirror compact anastigmat telescopes.

Figure 2:
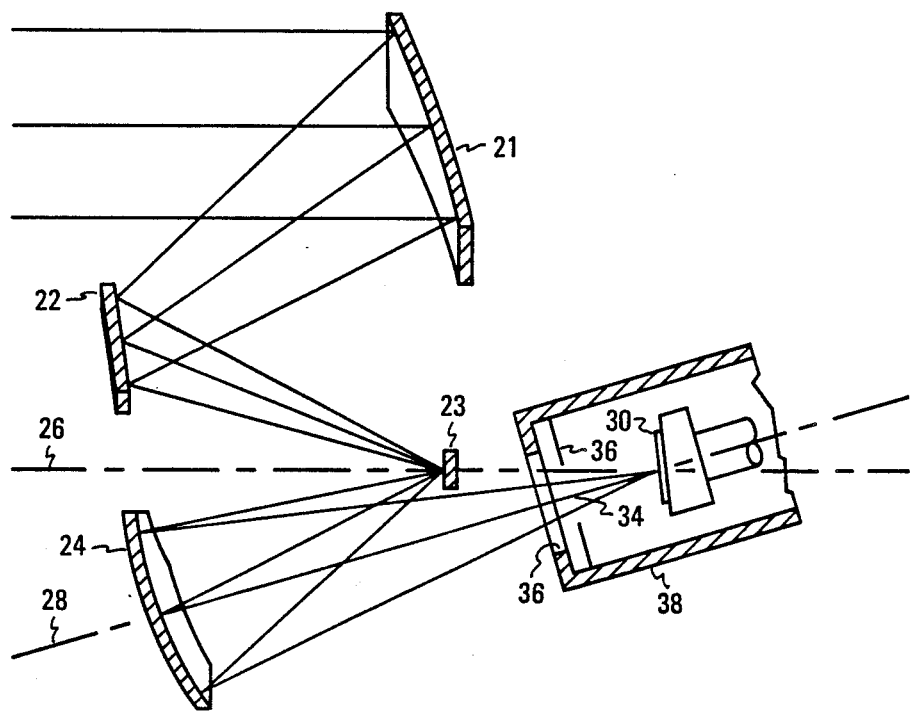
FIG. 2 is diagrammatic showing in side elevation of an infrared detection system of the kind to which the present invention has application.

The problem of exit pupil quality is compounded in detection systems that include off-axis or non-axisymmetric optic elements, due to the greater magnitude of optical aberrations and the correspondingly greater difficulty of correcting them in off-axis systems. The present invention is particularly directed to such systems, a representative embodiment of which is diagrammatically illustrated in FIG. 2.

In that figure, an infrared detection system is shown with a re-imaging mirror telescope comprising four first-surface mirrors 21, 22, 23 and 24. Each of the four mirrors may comprise a sector of an annulus forming part of a surface of revolution; all four of these surfaces of revolution have a common axis 26 normal to the plane of the first image as formed on the surface of mirror 23. Axis 26 may be regarded as the optical axis of the system, and is non-coincident with a second axis or line of focus 28 that intersects the focal plane of the final image as formed at the surface of a detector element 30.

Figure 3A:
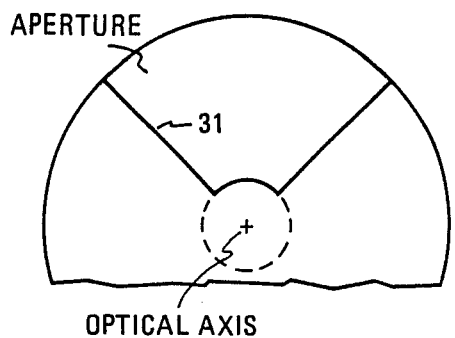
FIGS. 3A, 3B and 3C illustrate typical aperture stop configurations in non-axisymmetric optics systems such as shown in FIG. 2.

In the mirror telescope illustrated the aperture stop designated by reference numeral is constituted by the first mirror, 21, and since as previously indicated this mirror is a sector of an annulus, the aperture stop takes the form of a simple sector as shown at 31 in FIG. 3A. Other stop configurations such as shown in 3B and 3C also are possible as will be discussed.

The aperture stop is imaged at an exit pupil point 34 that is located just inside an aperture 36 in the end wall of a cold shield housing member 38 adjacent to the detector element 30 enclosed within the cold shield. The field of view included in the second image as formed at the detector element 30 is thus delimited by both the aperture stop and by the cold shield aperture or any adjacent exit pupil stop such as at 36.

Figure 4:
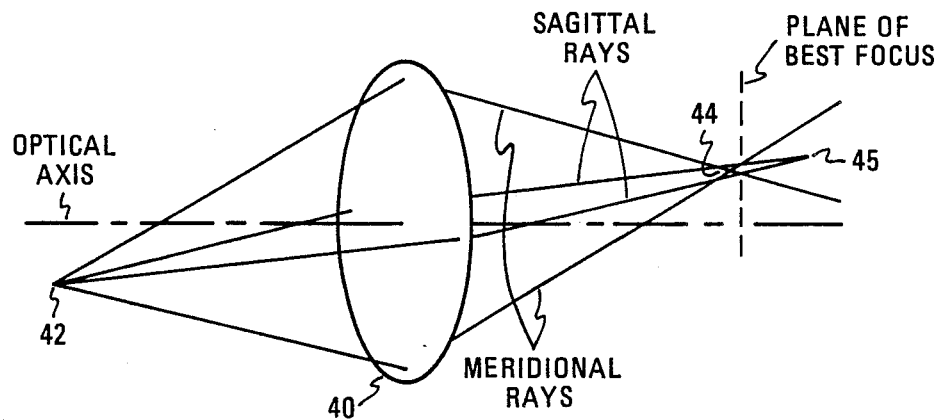
FIG. 4 illustrates diagrammatically the problem of astigmatism in the system of FIG. 2.

Turning now to FIG. 4, this figure is intended to illustrate the adverse effects of astigmatism on the quality of the exit pupil for off-axis image points. For simplicity a lens element 40 rather than a mirror is shown. Rays emanating from off-axis point 42 may be seen to focus at two different points 44 and 45 depending on whether rays from them are traced in the sagittal (the horizontal plane in FIG. 4) or the meridional (vertical) plane. While a plane of best focus for the image of point 42 can be found, this focus is poor at the exit pupil point because of uncorrected astigmatism.

Figure 5:
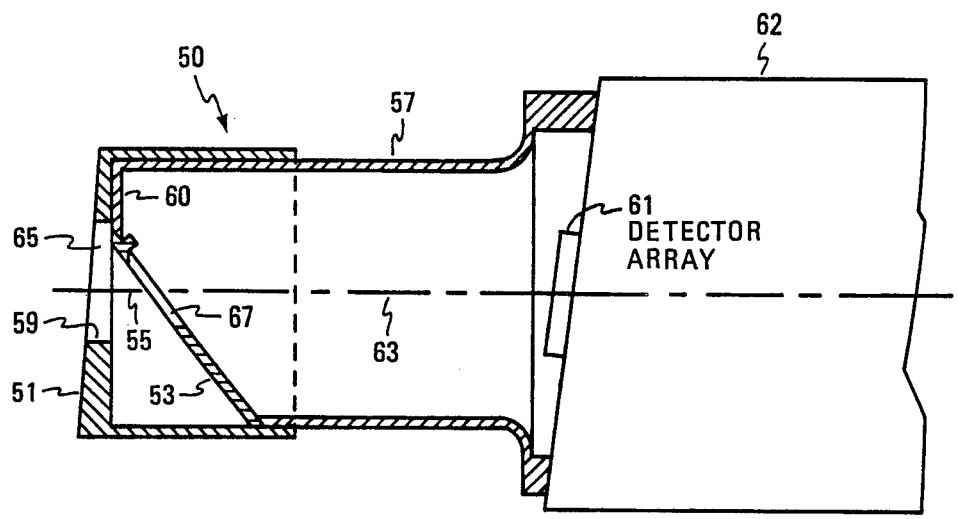
FIG. 5 is a part sectional view of an infrared detection system cold shield structure including sagittal and meridional exit pupil stops configured in accordance with the invention.

In accordance with the invention, imperfections in exit pupil quality resulting from such astigmatism are accommodated by use of a novel exit pupil stop assembly designated generally by reference numeral 50 in FIG. 5. This assembly comprises first and second stop members 51 and 53 positioned adjacent the exit pupil point 55. Stop member 51 may conveniently be formed as part of the cold shield enclosure 57, with its stop aperture 59 constituting also the cold shield entrance aperture. The second stop member, 53, is positioned within the cold shield 57 and may be held in place by interlocking it between stop member 51 and cold shield wall member 60 in the arrangement shown.

The detector element 61 is mounted to a cold finger structure 62 housed within cold shield enclosure 57 in alignment with aperture 59 along a line of focus 63. It will be noted that due to the axial non-symmetry of the associated focal system, this line of focus 63 is not normal to the detector element surface; such surface is tilted, in the plane of the system asymmetry, through an angle complementary to that between line 63 and the optical axis of the focal system.

Each of the two stop members 51 and 53 includes a planar surface in which is formed one of a pair of complementary exit pupil stop apertures 65 and 67. Where the focal system aperture stop is in the form of a simple sector such as shown in FIG. 3A, the exit pupil stop apertures are configured as shown at 69 and 71 in FIGS. 6A and 6B, respectively.

Figure 6A:
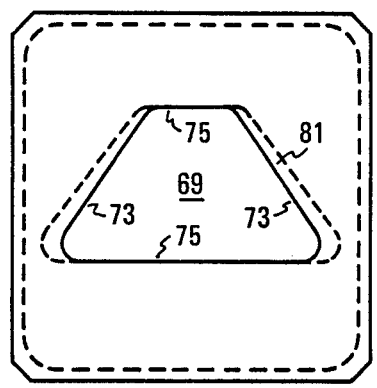
FIGS. 6A and 6B are plan views of sagittal and meridional stops, respectively, appropriately shaped for use with a simple sector aperture stop like that shown in FIG. 3A.
Figure 6B:
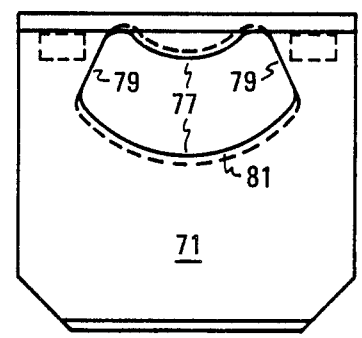

The stop aperture 69 in FIG. 6A includes radially extending edges 73 which are disposed congruently with the radially extending edges of the aperture stop image at the exit pupil, and which bound the field in the circumferential direction only. The circumferentially extending edges 75 of aperture 69 preferably are located sufficiently outside the field so as not to bound it in the radial direction. The other stop aperture, 71 in FIG. 6B, is complementarily configured with its circumferentially extending edges 77 disposed congruently with the corresponding aperture stop image edges, and with its radially extending edges 79 lying outside the field. The field-bounding edges of both stop members preferably are chamfered as at 81, so that only the front surface edges are operative to define the effective exit pupil stop aperture perimeter.

Congruency of the operative edges of the stop apertures 69 and 71 with the corresponding edges of the aperture stop image at the exit pupil point is achieved by ray tracing in orthogonally related planes, i.e., the sagittal and meridional planes, using well known ray tracing techniques and formulae. Sufficient points on the circumferentially extending edges of the aperture stop are traced in the sagittal plane to determine the orientation of the plane of best exit pupil formation for these edges, and to locate in this plane the corresponding points on the circumferentially extending edges of the exit pupil stop aperture. Similarly, a number of points on the radially extending edges of the aperture stop are traced in the meridional plane to locate the plane of best exit pupil formation for these radially extending edges and to define the congruent configuration of the exit pupil stop aperture edges corresponding to them.

Because of the axial non-symmetry of the optical system the respective planes in which the front surfaces of the two exit pupil stop members lie will be found to be non-coincident. With a system of the general configuration shown in FIG. 2, for example, the angle of divergence between these planes may be of the order of 40 degrees. It will be noted also that in the vertical plane (the plane of the paper in FIG. 5), neither of the stop members 51 and 53 has its planar front surface perpendicular to the line of focus 63 at the detector element; the stop member 51 in this example makes an angle of about 3 degrees with the line of focus, and stop member 53 an angle of about 37 degrees. In the horizontal plane in FIG. 5 the front surfaces of the two stop members will normally be perpendicular to the line of focus, because the optical system is axisymmetric in this plane and tilting of the stop members is accordingly not necessary.

Figure 3B:
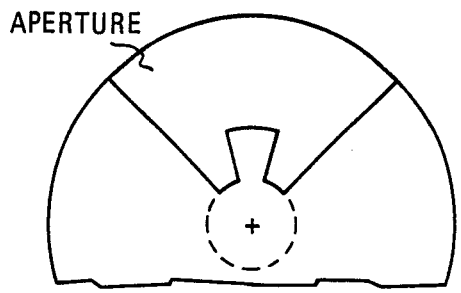
Figure 3C:
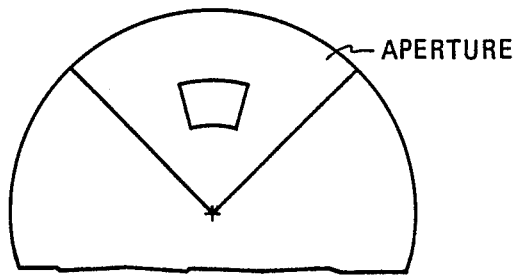

Configuring the exit pupil stop members as above described enables shapes which are well imaged in spite of severe astigmatism, thus improving cold shielding over that achievable for apertures that have been shaped without regard for the effects of exit pupil aberrations. Implicit in this technique is the idea that the best aperture shapes are those whose edges all are coincident with lines disposed either radially or circumferentially with respect to the optical axis. In addition to the simple sector shown in FIG. 3A, other aperture shapes that conform to this design rule are shown in FIGS. 3B and 3C.

Figure 7A:
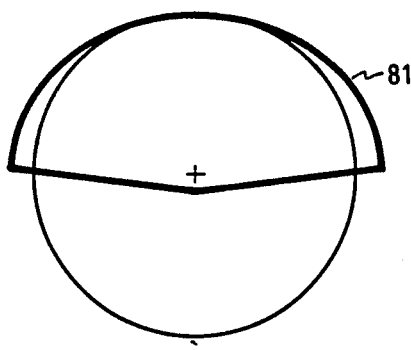
FIG. 7A, 7B and 7C illustrate aperture stop configurations not well adapted to use in accordance with the invention.
Figure 7B:
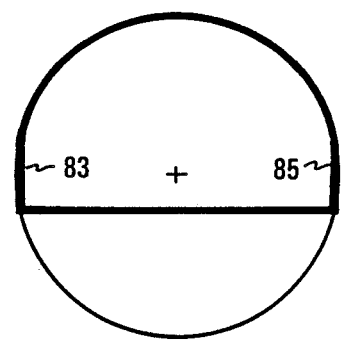
Figure 7C:
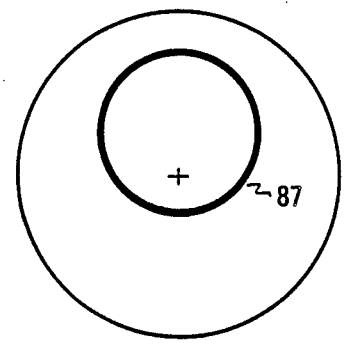

FIG. 7A, 7B and 7C illustrate aperture shapes that do not satisfy this design rule. The arc 81 in FIG. 7A is not circumferential with respect to the optical axis; the straight line segments 83 and 85 in FIG. 7B are not radial, and the circular aperture 87 in FIG. 7C is not concentric with the axis and so is not circumferential with respect thereto. These aperture shapes accordingly do not lend themselves well to use in cold-shielding in accordance with the technique of this invention.

There is a well known performance optimization for telescope design that states that the aperture perimeter should be minimized. This rule, however, applies to image plane spot size reduction. In most IR systems the exit pupil is very large compared to the spot size so the diffraction caused by a long aperture perimeter has relatively little effect on the quantitative measure of cold shield performance. This is because the diffraction zone is typically of the dimension of the focal plane spot size which is small compared to the exit pupil area. Therefore, even relatively long aperture perimeters such as those in FIGS. 3B and 3C are feasible though they generally are somewhat less efficient than a simple sector shaped aperture.

In the foregoing the exit pupil stop apertures have been illustrated and described as being formed in planar surfaces, with reference being made throughout to "planes" of best exit pupil formation. It is to be understood, however, that such "planes" are not necessarily perfectly planar. While it generally is preferable in the interests of simplicity and economy to form the stops with flat surfaces, further improvement in the quality of the exit pupils at the stop surfaces may be possible in some cases by warping them so as to place each point thereon precisely at the location of best imaging of the corresponding point on the aperture stop. In practice, however, when scatter from the focal system sets the limits of stray radiation suppression, further improvement in cold shielding through the use of non-planar stops may be of little benefit.

What is claimed is:

1. In combination in an infrared detection system that includes an infrared sensitive detector element and a cold shield enclosure in which said detector element is mounted and into which infrared radiation may enter through a cold shield aperture aligned with an image surface on said detector element, an optical system having a line of focus intersecting said detector element image surface and lying within orthogonally related sagittal and meridional planes, comprising:

(a) an optical train disposed externally of said cold shield for collecting far-field infrared radiation and focusing the same at said detector element image surface;

(b) means defining an aperture stop located outside said cold shield and imaged by said optical train at an exit pupil point located adjacent said cold shield aperture, said aperture stop being defined in part by edges that extend radially with respect to said line of focus and in part by edges that extend circumferentially with respect thereto;

(c) first exit pupil stop means defining an aperture having its radially extending edges configured correspondingly to the radially extending edges of said aperture stop and disposed in the plane of best exit pupil formation for aperture stop image points in said sagittal plane; and (d) second exit pupil stop means defining an aperture having its circumferentially extending edges configured correspondingly to the circumferentially extending edges of said aperture stop and disposed in the plane of best exit pupil formation for aperture stop image points in said meridional plane;

whereby said first and second exit pupil stop means together define an exit pupil that is optimally congruent with the aperture stop image as formed at the exit pupil point notwithstanding the optical aberrations present in said image.

2. In combination in an infrared detection system that includes an infrared sensitive detector element and a cold shield enclosure in which said detector element is mounted and into which infrared radiation may enter through a cold shield aperture aligned with an image surface on said detector element, an optical system having a line of focus intersecting said detector element image surface and lying within orthogonally related sagittal and meridional planes, comprising:

(a) an optical train including at least one non-axisymmetric element disposed externally of said cold shield for collecting far-field infrared radiation and imaging the same at first and second focal planes the latter of which is coincident with said detector element image surface, with the elements of said optical train defining a non-axisymmetric aperture stop located outside said cold shield and imaged at an exit pupil point located adjacent said cold shield aperture, said aperture stop being defined in part by edges that extend radially with respect to an axis of the optical train and in part by edges that extend circumferentially with respect thereto;

(b) first exit pupil stop means defining an aperture having its radially extending edges configured congruently with the radially extending edges of said aperture stop image at the exit pupil and disposed in the plane of best exit pupil formation for said aperture stop image radial edges in said sagittal plane, the circumferentially extending edges of said first exit pupil stop means being located outside the aperture stop image;

(c) second exit pupil stop means defining an aperture having its circumferentially extending edges configured congruently with the circumferentially extending edges of said aperture stop image at the exit pupil and disposed in the plane of best exit pupil formation for said aperture stop image circumferential edges in said meridional plane, the radially extending edges of said second exit pupil stop means being located outside the aperture stop image;

whereby said first and second exit pupil stop means together define an exit pupil that is optimally congruent with the aperture stop image as formed at the exit pupil point notwithstanding the optical aberrations present in said image.

3. An infrared detection system as defined in claim 2 wherein said first and second exit pupil stop means are planar and are disposed in non-coplanar relation with each other, with each being tilted with respect to the plane of axial asymmetry of said optical train so as to lie in the plane of best exit pupil formation for the respective stop means.

* * * * *